US011192097B2

(12) United States Patent
Lee et al.

(10) Patent No.: US 11,192,097 B2
(45) Date of Patent: Dec. 7, 2021

(54) CATALYST AND METHOD OF USE THEREOF IN CONVERSION OF $NO_x$ AND $N_2O$

(71) Applicant: SHELL OIL COMPANY, Houston, TX (US)

(72) Inventors: Steven Russell Lee, Houston, TX (US); Wenzhong Zhang, Houston, TX (US); Geert Marten Bakker, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 36 days.

(21) Appl. No.: 16/630,043

(22) PCT Filed: Jul. 9, 2018

(86) PCT No.: PCT/US2018/041275
§ 371 (c)(1),
(2) Date: Jan. 10, 2020

(87) PCT Pub. No.: WO2019/014115
PCT Pub. Date: Jan. 17, 2019

(65) Prior Publication Data
US 2021/0178371 A1    Jun. 17, 2021

Related U.S. Application Data

(60) Provisional application No. 62/530,880, filed on Jul. 11, 2017.

(51) Int. Cl.
*B01J 29/80* (2006.01)
*B01J 29/76* (2006.01)
(Continued)

(52) U.S. Cl.
CPC .......... *B01J 29/80* (2013.01); *B01D 53/9418* (2013.01); *B01J 29/763* (2013.01);
(Continued)

(58) Field of Classification Search
CPC .............. B01D 53/565; B01D 53/8628; B01D 2255/20738; B01D 2255/50;
(Continued)

(56) References Cited

U.S. PATENT DOCUMENTS 9,517,461 B2 * 12/2016 Grossschmidt .......... B01J 29/76
2010/0221165 A1 *  9/2010 Hanke ................ B01D 53/8628
                                                                    423/239.2
(Continued)

FOREIGN PATENT DOCUMENTS

EP    2520365 A2    11/2012
WO    0072965 A1    12/2000

OTHER PUBLICATIONS

International Search Report and Written Opinion received for PCT Patent Application No. PCT/US2018/041275, dated Oct. 18, 2018, 12 pages.
(Continued)

*Primary Examiner* — Timothy C Vanoy
(74) *Attorney, Agent, or Firm* — Shell Oil Company

(57) ABSTRACT

A catalyst for the conversion of $NO_X$ and $N_2O$ comprising iron chabazite and iron beta zeolite. A method of simultaneously reducing the $NO_X$ and $N_2O$ concentration in a
(Continued)

process gas stream comprising contacting the process gas stream with a catalyst comprising iron chabazite and iron beta zeolite under conversion conditions.

24 Claims, 3 Drawing Sheets

(51) Int. Cl.
    *B01J 35/02*       (2006.01)
    *B01J 35/10*       (2006.01)
    *B01D 53/94*       (2006.01)

(52) U.S. Cl.
    CPC ......... *B01J 29/7615* (2013.01); *B01J 35/023* (2013.01); *B01J 35/1057* (2013.01); *B01D 2255/20738* (2013.01); *B01D 2255/502* (2013.01); *B01D 2255/9202* (2013.01); *B01J 2229/18* (2013.01)

(58) Field of Classification Search
    CPC ........ B01D 2255/502; B01D 2257/402; B01D 2257/404; B01D 2258/0283; B01J 23/745; B01J 29/7215; B01J 29/723; B01J 37/30
    See application file for complete search history.

(56) References Cited

U.S. PATENT DOCUMENTS

| | | |
|---|---|---|
| 2011/0286914 A1 | 11/2011 | Li et al. |
| 2013/0142727 A1 | 6/2013 | Li et al. |
| 2015/0290632 A1 | 10/2015 | Lambert et al. |
| 2016/0367939 A1 | 12/2016 | Fedeyko et al. |

OTHER PUBLICATIONS

Martin et al., "Fe-Containing Zeolites for NH3-SCR of NOx: Effect of Structure, Synthesis Procedure, and Chemical Composition on Catalytic Performance and Stability", Chemistry—A European Journal, vol. 23, Issue No. 54, Aug. 29, 2017, pp. 13404-13414, XP055512380.

Gao et al., "Iron Loading Effects in Fe/SSZ-13 NH3-SCR Catalysts: Nature of the Fe Ions and Structure-Function Relationships", ACS Catalysis, vol. 6, Issue No. 5, Apr. 8, 2016, pp. 2939-2954, XP055513461.

* cited by examiner

CATALYST AND METHOD OF USE THEREOF IN CONVERSION OF $NO_x$ AND $N_2O$

CROSS REFERENCE TO EARLIER APPLICATION

The present application is the National Stage (§ 371) of International Application No. PCT/US2018/041275, filed Jul. 9, 2018, which benefits from the priority of U.S. Provisional Application Ser. No. 62/530,880, filed Jul. 11, 2017, hereby incorporated by reference in its entirety.

FIELD OF THE INVENTION

The invention relates to a catalyst and a method of simultaneously reducing the $NO_X$ and $N_2O$ concentration in a process gas stream.

BACKGROUND OF THE INVENTION

Nitric oxides and nitrous oxide are known polluting gases and efforts have been made to limit the amount of these compounds entering the atmosphere. These are found in exhaust gases and process gas streams in a number of industrial processes. In addition, these are found in the exhaust gases of mobile vehicles; cars, trucks, buses, etc. Selective catalytic reduction is a known method for removing these compounds from process gas streams by converting nitrous oxides and nitric oxides to nitrogen and water.

US 20110286914 discloses an organic-free, metal-containing zeolite Beta with a silica-to-alumina ratio ranging from 5 to 20, and a metal content of at least 0.5 wt %. The published patent application also discloses a method of selective catalytic reduction of nitrogen oxides in exhaust gases using the zeolite Beta.

US 20130142727 discloses a microporous crystalline material having a pore opening ranging from 3 to 5 Angstroms, where the material comprises a first metal chosen from alkali earth group, rare earth group, alkali group, or mixtures thereof, and a second metal chosen from iron, copper or mixtures thereof; and has a molar silica to alumina ratio from 3 to 10. The published patent application also discloses a method of selective catalytic reduction of nitrogen oxides in exhaust gas.

It is advantageous to develop improved catalysts that are more effective and more stable in this reaction so that the units can be operated over a longer duration without maintenance or catalyst replacement.

SUMMARY OF THE INVENTION

The invention provides a catalyst for the conversion of $NO_X$ and $N_2O$ comprising iron chabazite and iron beta zeolite.

The invention provides a method of simultaneously reducing the $NO_X$ and $N_2O$ concentration in a process gas stream comprising contacting the process gas stream with a catalyst comprising iron chabazite and iron beta zeolite under conversion conditions.

DETAILED DESCRIPTION OF THE INVENTION

Figure 1:
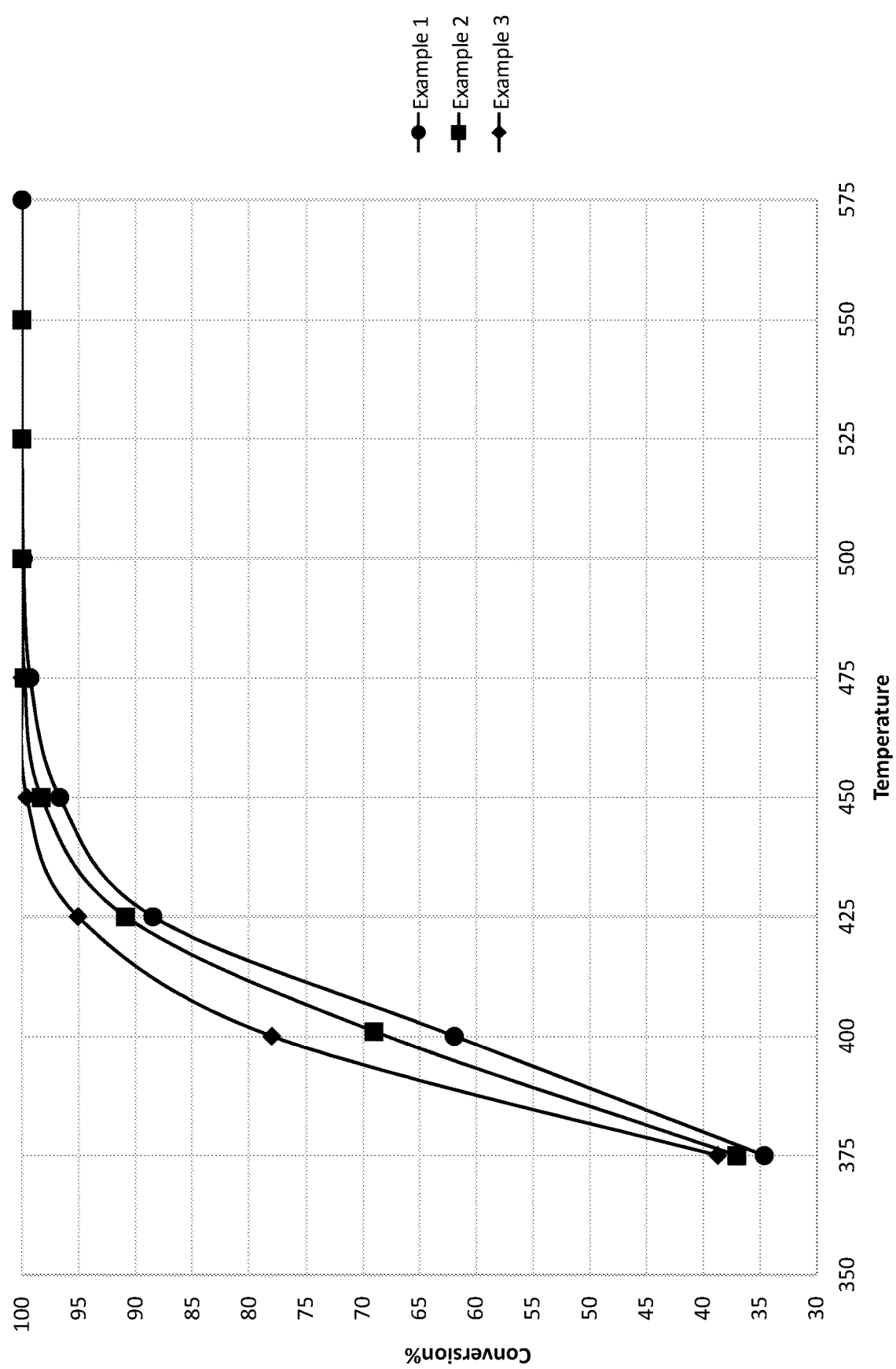
FIG. 1 depicts the N2O decomposition of three different catalysts.

The invention provides an improved catalyst for the conversion of $NO_X$ and $N_2O$. The catalyst comprises iron chabazite and iron beta zeolite.

The beta zeolite is preferably made without an organic structure directing agent. The resulting beta zeolite does not contain any residual organic materials in the pores of the material, and thus the treatments usually required to remove the organic components are not needed. In prior art catalysts, organic structure directing agents, such as tetraethylammonium hydroxide, dibenzylmethylammonium, and dibenzyldimethyl ammonium hydroxide, were used in the precursor materials. The cost of these compounds and the fact that they usually remain in the pores after manufacture is a problem in the synthesis of these beta zeolite materials.

The beta zeolite preferably has a silica-to-alumina ratio of from 5 to 20. The silica-to-alumina ratio is preferably not more than 12, and more preferably in a range of from 5 to 11. The beta zeolite preferably has an average crystal size of greater than 0.1 microns, more preferably of from 0.2 to 5 microns.

The iron beta zeolite using the above described beta zeolite preferably comprises at least 0.5 wt % iron, more preferably from 1 to 10 wt % iron. The catalyst may also contain alumina.

The iron is preferably added to the catalyst components (chabazite and beta zeolite) by one or more methods, including liquid phase or solid ion exchange, impregnation or incorporation by direct synthesis. In a preferred embodiment, the iron is preferably added by ion exchange.

The iron used in the ion exchange method is typically an iron salt and it may be ferric nitrate, ferric chloride, ferrous chloride, ferrous sulfate or mixtures thereof.

One method for making the beta zeolite starts with making an aqueous solution comprising NaOH and a source of alumina. The alumina source may be sodium aluminate, aluminum hydroxide, alumina, aluminum nitrate, aluminum alcoholates, or aluminum sulfate. Then a source of silica is added to the solution. The silica may comprise a silica gel, silica sol, silica hydrosols, fumed silica, reactive amorphous solid silicas, silicic acid, water glass, sodium silicate, sodium metasilicate, colloidal silicate, pyrogenic silica, precipitated silicate, silica alumina and other similar materials. Then a source of beta zeolite is added and the mixture is mixed to form a gel. The source of the beta zeolite may be a commercially available beta zeolite. The gel is heated to form a product and this step is carried out until the desired crystal size and purity are achieved. The heating may comprise heating the gel at a temperature ranging from 100 to 200° C. for up to 200 hours. Once the crystallized material is formed, it may be treated by isolation, washing and drying. The isolation may be carried out by any method known to one of skill in the art, including filtration, centrifugation or decantation. The washing may be carried out with any known agent including water or alcohols. Additionally, sodium may be removed from the zeolite, by, for example, ion exchange.

In another embodiment, the beta zeolite may be made by preparing a mixture of seed crystals, a source of $SiO_2$ and a source of $Al_2O_3$ and crystallizing the mixture. The seed crystals may be beta zeolite crystals.

The chabazite is preferably also made without an organic structure directing agent. This provides similar benefits as described above with regards to the iron beta zeolite. The chabazite may be made by mixing sources of sodium, potassium, alumina, silica, and water to form a gel and then heating the gel at a temperature in the range of from 80 to 200° C. The crystalline product formed can then be ammonium-exchanged.

The chabazite prepared without an organic structure directing agent preferably has a pore opening of from 3 to 5 Angstroms. The chabazite preferably has a silica-to-alumina ratio of from 3 to 10. The chabazite preferably has an average crystal size of from 0.3 to 10 microns, preferably from 0.3 to 5.0 microns.

The iron chabazite using the above described chabazite preferably comprises from 0.5 to 5.0 wt % iron. The iron may be added by liquid phase or solid ion exchange. Alternatively, the iron may be added by impregnation or may be added during the zeolite synthesis steps.

The catalyst comprising iron chabazite and iron beta zeolite may be in the form of channeled or honeycomb, metal plate type or corrugated plate type catalyst. Alternatively, the catalyst may be present as a packed bed, which may comprise balls, pebbles, pellets, tablets or extrudates. The catalyst may be present in the form of microspheres.

The catalyst may be formed by creating a slurry of a fine powder of the zeolite materials, which is then admixed with a suitable binder. The binder may comprise alumina, bentonite, silica or silica-alumina. The slurry may then be deposited on a suitable substrate in the form of a honeycomb or other shape with a plurality of channels.

The catalyst may comprise a blend of iron chabazite and iron beta zeolite, a plurality of layers where each layer comprises an individual iron chabazite or iron beta zeolite component or a plurality of zones where each zone comprises an individual iron chabazite or iron beta zeolite. A blend of the catalysts may comprise a volume of both the iron chabazite and the iron beta zeolite having approximately the same proportions relative to one another throughout the volume of the blend. In another embodiment, the blend of catalysts may be disposed in a plurality of layers or zones.

The catalyst can be used in a method for simultaneously reducing the $NO_X$ and $N_2O$ concentration in a process gas stream. In the process, the process gas stream is contacted with the catalyst under conversion conditions. The conversion conditions may include a temperature in the range of from 250 to 650° C.

Ammonia, urea, or an ammonia generating compound may be added to the process gas before or at the same time as the process gas is contacted with the catalyst. The ammonia generating compound may be ammonium carbamate, ammonium formate, ammonium carbonate or metal-amine complexes.

In addition to ammonia, the contacting may be carried out in the presence of water. The water may be present in an amount of at least 0.5 vol. %, preferably at least 2 vol. %, calculated as a percentage of the combined process gas, ammonia, and water stream.

EXAMPLES

Comparative Example 1

In this example, a catalyst was tested to determine the $N_2O$ conversion at a range of temperatures. The catalyst was an iron chabazite catalyst. The testing conditions comprised a pressure of 9 bar and GHSV of 40,000 $hr^{-1}$. The gas mixture that was passed across the catalyst comprised 750 ppmv $N_2O$, 400 ppmv NO, 0.5 vol. % oxygen and the balance was nitrogen. The conversion measured in this example is depicted in FIG. 1.

Comparative Example 2

In this example, a second catalyst was tested under the same conditions as described in Example 1. The catalyst was an iron beta zeolite catalyst. The conversion measured in this example is depicted in FIG. 1.

Example 3

In this example, a third catalyst was tested under the same conditions as described in Example 1. The catalyst comprised both iron chabazite and iron beta zeolite catalyst. The conversion measured in this example is depicted in FIG. 1. As can be seen from FIG. 1, this catalyst is more active than either the catalyst of Example 1 or the catalyst of Example 2.

Example 4

Figure 2:
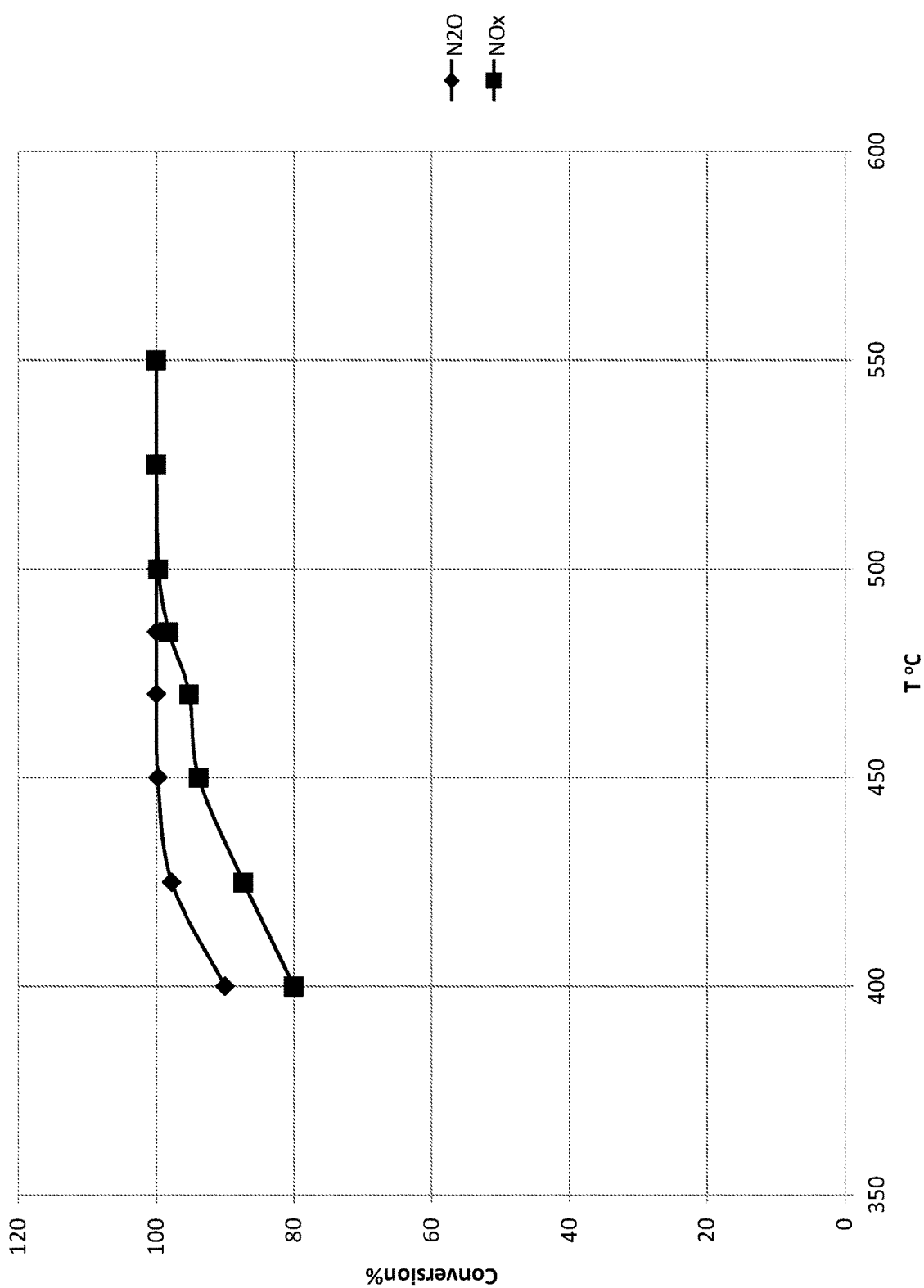
FIG. 2 depicts the $N_2O$ decomposition and the $NO_X$ conversion of a catalyst comprising iron chabazite and iron beta zeolite.

This example demonstrates the decomposition of $N_2O$ and the conversion of $NO_X$ over a catalyst comprising both iron chabazite and iron beta zeolite. The test was carried out at a pressure of 9 bar and GHSV of 20,800 $hf^{-1}$. The gas mixture that was passed across the catalyst comprised 1000 ppmv $N_2O$, 400 ppmv NO, 400 ppmv NH3, 0.5 vol. % water, 2 vol. % oxygen and the balance was nitrogen. The $N_2O$ decomposition and $NO_X$ conversion are shown in FIG. 2 over a number of temperatures ranging from 400 to 550° C.

Example 5

Figure 3:
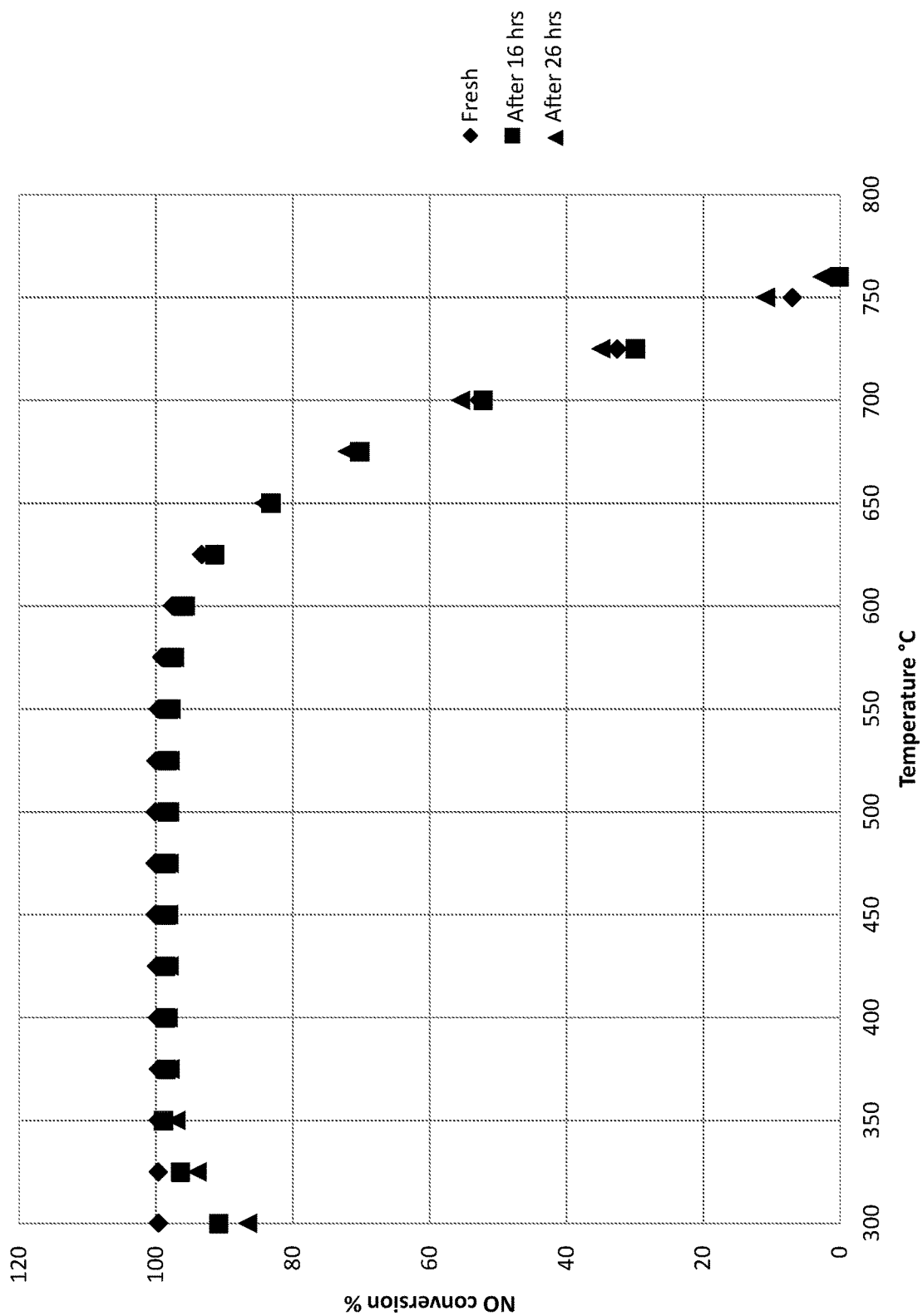
FIG. 3 depicts the hydrothermal stability of a catalyst comprising iron chabazite and iron beta zeolite.

This example demonstrates the hydrothermal stability of the catalyst comprising iron chabazite and iron beta zeolite. The catalyst was tested at ambient pressure and GHSV of 100,000 $hr^{-1}$. The gas mixture that was passed across the catalyst comprised 200 ppmv NO, 300 ppmv NH3, 11 vol. % water, 7.5 vol. % oxygen and the balance was nitrogen. FIG. 3 depicts the conversion of NO using a fresh catalyst and the same catalyst after it had been hydrothermally aged at 760° C. with 11% water for 16 hours and 26 hours. The catalyst is quite stable even after hydrothermal aging.

What is claimed is:

1. A catalyst for the conversion of $NO_x$ and $N_2O$ comprising iron chabazite and iron beta zeolite.

2. The catalyst of claim 1, comprising alumina.

3. The catalyst of claim 2, wherein the iron chabazite is made without an organic structure directing agent.

4. The catalyst of claim 3, wherein the iron chabazite has a pore opening of from 3 to 5 Angstroms.

5. The catalyst of claim 4, wherein the iron chabazite has a silica-to-alumina ratio of from 3 to 10.

6. The catalyst of claim 5, wherein the iron chabazite has an average crystal size of from 0.3 to less than 10 microns.

7. The catalyst of claim 6, wherein the iron chabazite has an average crystal size of from 0.3 to 5.0 microns.

8. The catalyst of claim 7, wherein the iron chabazite comprises from 0.5 to 5.0 wt % of iron.

9. The catalyst of claim 8, wherein the iron beta zeolite is made without an organic structure directing agent.

10. The catalyst of claim 9, wherein the iron beta zeolite has a silica-to-alumina ratio of from 5 to 20.

11. The catalyst of claim 10, wherein the iron beta zeolite has a silica-to-alumina ratio of from 5 to 11.

12. The catalyst of claim 11, wherein the iron beta zeolite comprises at least 0.5 wt % of iron.

13. The catalyst of claim 12, wherein the iron beta zeolite comprises from 1 to 10 wt % iron.

14. The catalyst of claim 13, wherein the iron beta zeolite has an average crystal size of greater than 0.1 microns.

15. The catalyst of claim 14, wherein the iron beta zeolite has an average crystal size of from 0.2 to 5 microns.

16. The catalyst of claim 15, wherein the iron was added to the beta zeolite and the chabazite zeolite by ion exchange.

17. The catalyst of claim 16, wherein the iron used in the ion exchange method was an iron salt selected from the group consisting of ferric nitrate, ferric chloride, ferrous chloride, ferrous sulfate and mixtures thereof.

18. A method of simultaneously reducing a $NO_x$ and $N_2O$ concentration in a process gas stream comprising contacting the process gas stream with a catalyst comprising iron chabazite and iron beta zeolite under conversion conditions.

19. The method of claim 18, comprising adding ammonia, urea or an ammonia generating compound to the process gas before or at the same time as the process gas is contacted with the catalyst.

20. The method of claim 19, wherein the ammonia generating compound is selected from the group consisting of ammonium carbamate, ammonium formate, ammonium carbonate and metal-amine complexes.

21. The method of claim 19, wherein the ammonia to $NO_x$ ratio is 1:1.

22. The method of claim 20, wherein the contacting is carried out in the presence of at least 0.5 vol. % water.

23. The method of claim 21, wherein the contacting is carried out in the presence of at least 2 vol. % water.

24. The method of claim 23, wherein the conversion conditions comprise a temperature in the range of from 250 to 650° C.

\* \* \* \* \*